US008380340B2

(12) United States Patent
Abe

(10) Patent No.: US 8,380,340 B2
(45) Date of Patent: Feb. 19, 2013

(54) NUMERICAL CONTROL APPARATUS WITH MANUAL SHIFT OPERATION FUNCTIONALITY

(75) Inventor: Tomohiro Abe, Niwa-gun (JP)

(73) Assignee: Okuma Corporation, Aichi-Prefecture (JP)

(*) Notice: Subject to any disclaimer, the term of this patent is extended or adjusted under 35 U.S.C. 154(b) by 189 days.

(21) Appl. No.: 12/257,068

(22) Filed: Oct. 23, 2008

(65) Prior Publication Data

US 2009/0112356 A1 Apr. 30, 2009

(30) Foreign Application Priority Data

Oct. 26, 2007 (JP) ................................ 2007-279111

(51) Int. Cl.
*G06F 19/00* (2011.01)
(52) U.S. Cl. ......... 700/180; 700/159; 700/186; 700/192
(58) Field of Classification Search .................. 700/159, 700/176, 180, 182, 192, 186
See application file for complete search history.

(56) References Cited

U.S. PATENT DOCUMENTS

| 4,591,968 | A | * | 5/1986 | Nozawa et al. | 700/181 |
|---|---|---|---|---|---|
| 4,907,164 | A | * | 3/1990 | Guyder | 700/173 |
| 6,274,839 | B1 | * | 8/2001 | Stone et al. | 219/76.12 |
| 6,311,098 | B1 | * | 10/2001 | Higasayama et al. | 700/159 |
| 2005/0107000 | A1 | * | 5/2005 | Otsuki et al. | 451/5 |
| 2006/0173572 | A1 | * | 8/2006 | Sagasaki et al. | 700/181 |

FOREIGN PATENT DOCUMENTS

| JP | 57073409 A | 5/1982 |
|---|---|---|
| JP | 57075309 A | 5/1982 |
| JP | 2003-195917 | 7/2003 |

OTHER PUBLICATIONS

FANUC Series, "Common to Lathe/Machining Center System User's Manual (vol. 2 of2)" Jun. 2004.

* cited by examiner

*Primary Examiner* — Mohammad Ali
*Assistant Examiner* — Nathan Laughlin
(74) *Attorney, Agent, or Firm* — Nelson Mullins Riley & Scarborough LLP; Anthony A. Laurentano

(57) ABSTRACT

A numerical control apparatus provides for manual shift operation involving feed shafts of a machine tool in terms of a work coordinate system easily and readily understood by an operator. The numerical control apparatus includes a manual shift amount input unit for receiving an amount of manual shift involving linear feed shafts as operator-input data in terms of a work coordinate system defined on the work revolved or rotated by a rotary feed shaft. The numerical control apparatus further includes a manual shift amount cumulative storage for cumulatively storing the received amount of manual shift in terms of a work coordinate system. Also included is a cumulative shift amount coordinate converter for converting the cumulative amount of shift from the work coordinate system data to data in terms of machine coordinate system defined on the machine tool. The apparatus's manual shift amount superimposing unit then superimposes the converted cumulative amount of shift on a controlled variable commanded in a machining program to generate the result to servo drivers.

2 Claims, 10 Drawing Sheets

NUMERICAL CONTROL APPARATUS WITH MANUAL SHIFT OPERATION FUNCTIONALITY

FIELD OF THE INVENTION

The present invention relates to a numerical control apparatus capable of superimposing an amount of manual shift set by manual shift operation on a controlled variable defined in a program command.

BACKGROUND OF THE INVENTION

Certain machine tools are equipped with a plurality of linear feed shafts and rotary feed shafts. Known rotary feed shafts include a type that allows the main spindle head mounting a tool to turn or revolve, a type that allows the table for mounting work to turn, and a combination thereof. In a typical machine tool provided with a rotary feed shaft, in order to cut work, the position of the tip of the tool is controlled along a desired path while operating the rotary feed shaft as well as the biaxial or triaxial linear feed shafts oriented orthogonally to one another.

For example, in the machine tool shown in FIGS. 8A and 8B, a table 1 is supported by a rotary feed shaft 2 with work 3 secured on the table 1. The work 3 is then machined by causing the table 1 to be revolved or turned and the tip of the tool 4 to be linearly moved from P0 to P1 to P2 (P0→P1→P2) on the work 3. During this machining, although the tip of the tool 4 moves linearly in terms of a work coordinate system (Xw-Yw) defined on the work as shown in FIG. 8A, the tip of the tool 4 moves along a curved line in terms of a machine coordinate systems (X-Y) fixed on the tool machine as shown in FIG. 8B.

In a cutting operation that involves revolution or rotation of the table 1, therefore, commands need to be generated that define a large number of minute linear blocks into which the tool path R (P0→P1→P2) is segmented. As such, computer aided manufacturing (CAM) is the commonly employed method for defining such minute line segments. In this approach, however, since CAM is a prerequisite for preparation of a machining program and the program itself tends to be lengthy, various methods have been proposed for directly commanding, in a machining program, the travel path of the tool tip in terms of a work coordinate system.

For example, Japanese Published Unexamined Patent Publication No. 2003-195917 describes a numerical control apparatus capable of shortening and generating a machining program with relative ease by using commands that define the travel path of the tip of a tool in terms of a work coordinate system and controlling a rotary feed shaft and linear feed shafts to cause the travel path to rotate with the table. In the example shown in FIGS. 8A and 8B, a command for the direct linear movement (P0→P1→P2) is generated in terms of the work coordinate system and the angle of the rotary feed shaft 2 and the movement of the tool 4 along the Xw and Yw axis are controlled according to this command.

SUMMARY OF THE INVENTION

In a numerical control apparatus for machine tools, a manual shift operation may be performed through pulse handle inputs while the feed shafts are under the control of a machining program, wherein the amount of manual shift corresponding to the manual shift operation is superimposed on the controlled variable specified in a program command, thereby changing the tool path at a required timing during the machining. In a conventional numerical control apparatus with this type of function, such an amount of manual shift is entered as machine coordinate data about the linear or rotary feed shafts.

For example, a numerical control apparatus 50, schematically shown in FIG. 9, includes a machining program input/interpretation unit 51, a function generator 52, an input unit 53 for accepting or receiving an amount of manual shift (i.e., data in terms of a machine coordinate system), a cumulative manual shift amount storage 54, a manual shift amount superimposing unit 55, and servo drivers 56. To execute a machining program, the numerical control apparatus 50 is configured to cause the input unit 53 to receive an amount of manual shift, the cumulative storage 54 to accumulate the received amount of manual shift, the superimposing unit 55 to superimpose the accumulated amount of manual shift on the controlled variable specified in the machining program, the serve drivers 56 to control the plurality of feed shafts of the machine tool.

FIG. 10 illustrates a tool path R' that results if an amount of manual shift is superimposed in the conventional numerical control unit 50 if the rotary feed shaft is not operated. During the control of the movement of the tip of the tool by a machining program for causing tool tip movement from P0 to P1 to P2 (P0→P1→P2), if an amount of shift S is entered by a manual shift operation when the tip of the tool 4 reaches P1, the amount of shift S is superimposed on the controlled variable specified in the machining program, thus shifting the tool tip from P1 to Ps1. From this point on, the tip of the tool 4 traces the tool path R', which is offset by the amount of shift S from the original path R, subsequently reaching Ps2.

As shown in FIG. 8B, however, if the rotary feed shaft 2 is operated, i.e., if the work 3 is rotated with the table 1, it is not very convenient or expedient for the operator to enter an amount of manual shift into the input unit 53 as machine coordinate system data since the operator often cannot easily and intuitively appreciate the relationship between the work 3 and the tool 4. For this reason, it is preferable to enter amounts of manual shift in a work coordinate system. When the rotary feed shaft 2 is operated, however, the work coordinate system itself rotates with the table 1. One of the inherent problems of the conventional numerical control apparatus 50 is that the apparatus 50 is incapable of accommodating manual shift operation based on or in terms of a work coordinate system.

The present invention was made to provide solution to the above-identified problem and an important object thereof is to provide a numerical control apparatus that facilitates manual shift operation in terms of a coordinate system easily and readily understood by an operator.

An additional object of the present invention is to provide a numerical control system suitable for manual shift operation of or involving a rotary feed shaft of a machine tool.

In order to solve the above-identified problems, the present invention provides a numerical control apparatus capable of controlling at least one linear feed shaft and at least one rotary feed shaft of a machine tool according to commands of a machining program and superimposing an amount of manual shift entered by manual shift operation during the controlling on a controlled variable according to a program command.

In one aspect of the present invention, the numerical control apparatus comprises: a manual shift amount input unit for receiving an amount of manual shift of or involving the at least one linear feed shaft as data in terms of a work coordinate system defined on work revolved by the at least one rotary feed shaft; a manual shift amount cumulative storage for cumulatively storing the received amount of manual shift; a cumulative shift amount coordinate converter for converting the cumulatively stored amount of shift to data in terms of a machine coordinate system defined on the machine tool; and a manual shift amount superimposing unit for superimposing the converted cumulative amount of shift on a controlled variable according to a command in a machining program.

Since this numerical control apparatus receives inputs of an amount of manual shift involving at least one linear feed shaft of a machine tool as data in terms of a work coordinate system and converts a cumulatively stored amount of shift to data in terms of a machine coordinate system, the apparatus advantageously facilitates manual shift operation of or involving the at least one feed shaft in terms of a work coordinate system that is easily and readily understood by a machine operator.

In another aspect of the present invention, the numerical control apparatus comprises: a manual shift amount input unit for receiving an amount of manual shift involving the at least one linear feed shaft as data in terms of a tool coordinate system defined on a tool revolved by the at least one rotary feed shaft; a manual shift amount cumulative storage for cumulatively storing the received amount of manual shift; a cumulative shift amount coordinate converter for converting the cumulatively stored amount of shift to data in terms of a machine coordinate system defined on the machine tool; and a manual shift amount superimposing unit for superimposing the converted cumulative amount of shift on a controlled variable according to a command in a machining program.

In this aspect, since this numerical control apparatus receives inputs of an amount of manual shift involving at least one linear feed shaft of a machine tool as data in terms of a tool coordinate system and converts a cumulatively stored amount of shift to data in terms of a machine coordinate system, the apparatus advantageously facilitates manual shift operation of or involving the at least one feed shaft in terms of a work coordinate system that is easily and readily understood by a machine operator.

In still another aspect of the present invention, the numerical control apparatus comprises: a manual shift amount input unit for receiving an amount of manual shift of or involving the at least one rotary feed shaft; a manual shift amount cumulative storage for cumulatively storing the received amount of manual shift; a cancellation shift amount calculation unit for calculating a cancellation shift amount for canceling the displacement of a tip of a tool caused by the manual shift operation of or involving the at least one rotary feed shaft; and a manual shift amount superimposing unit for superimposing the calculated cancellation shift amount on a controlled variable according to a command in a machining program.

In this aspect, in manual shift operation involving the at least one rotary feed shift, the numerical control apparatus cancellation shift amount calculation unit cancels the displacement of a tip of a tool caused by the manual shift operation of or involving at least one rotary feed shaft, advantageously providing for manual shift operation of the at least one rotary feed shaft with the tool tip kept in contact with the part of the work to be machined.

In one embodiment, a numerical control apparatus further comprises a machine structure data storage for storing information about the structures of the at least one feed shaft of the machine tool as machine structure data, wherein the cumulative shift amount coordinate converter uses the machine structure data to perform the conversion.

One embodiment of the invention provides a numerical control apparatus integrating or including all or some of the functional components described in the foregoing aspects.

This integrative numerical control apparatus advantageously offers the functionality of comprehensively performing manual shift operation of or involving at least one linear feed shaft and at least one rotary feed shaft.

DETAILED DESCRIPTION OF PREFERRED EMBODIMENTS

Figure 1:
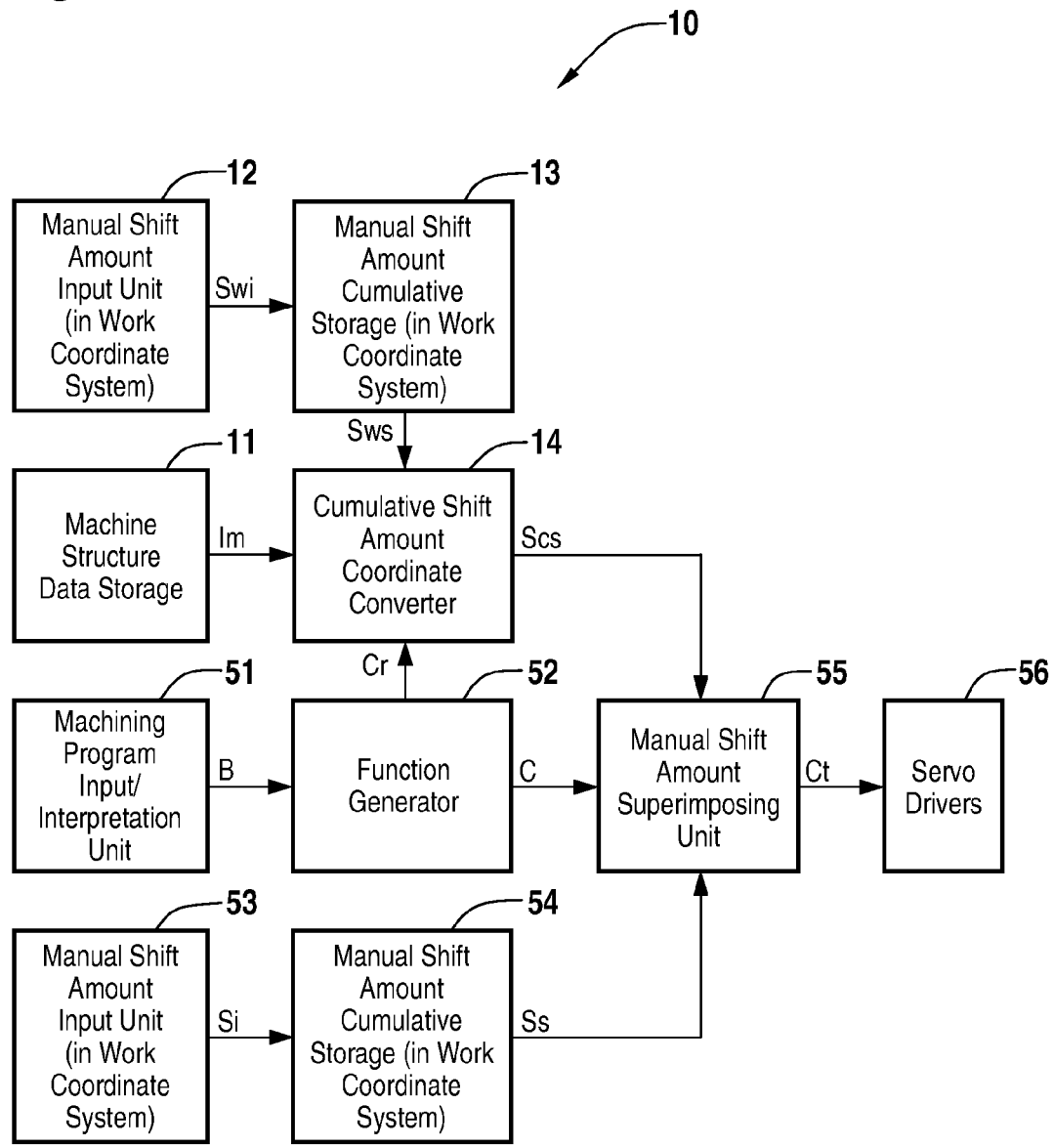
FIG. 1 is a schematic block diagram of a numerical control apparatus showing Embodiment 1 of the present invention.
Figure 2:
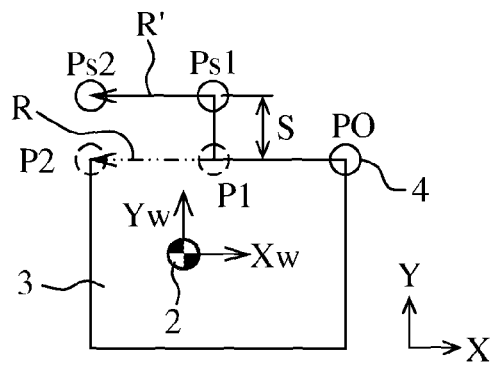
FIGS. 2A and 2B are schematic diagrams showing manual shift operations of the numerical control apparatus of shown in FIG. 1.
Figure 2:
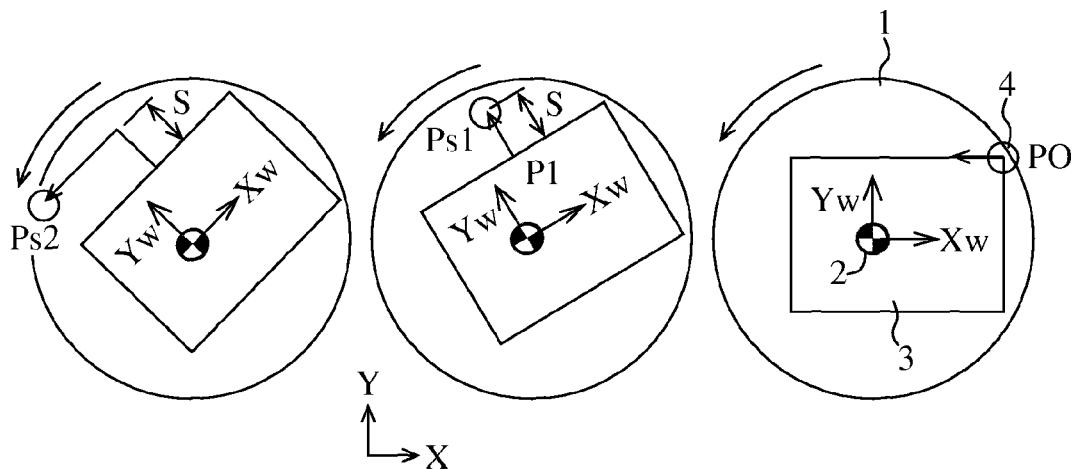
Figure 3:
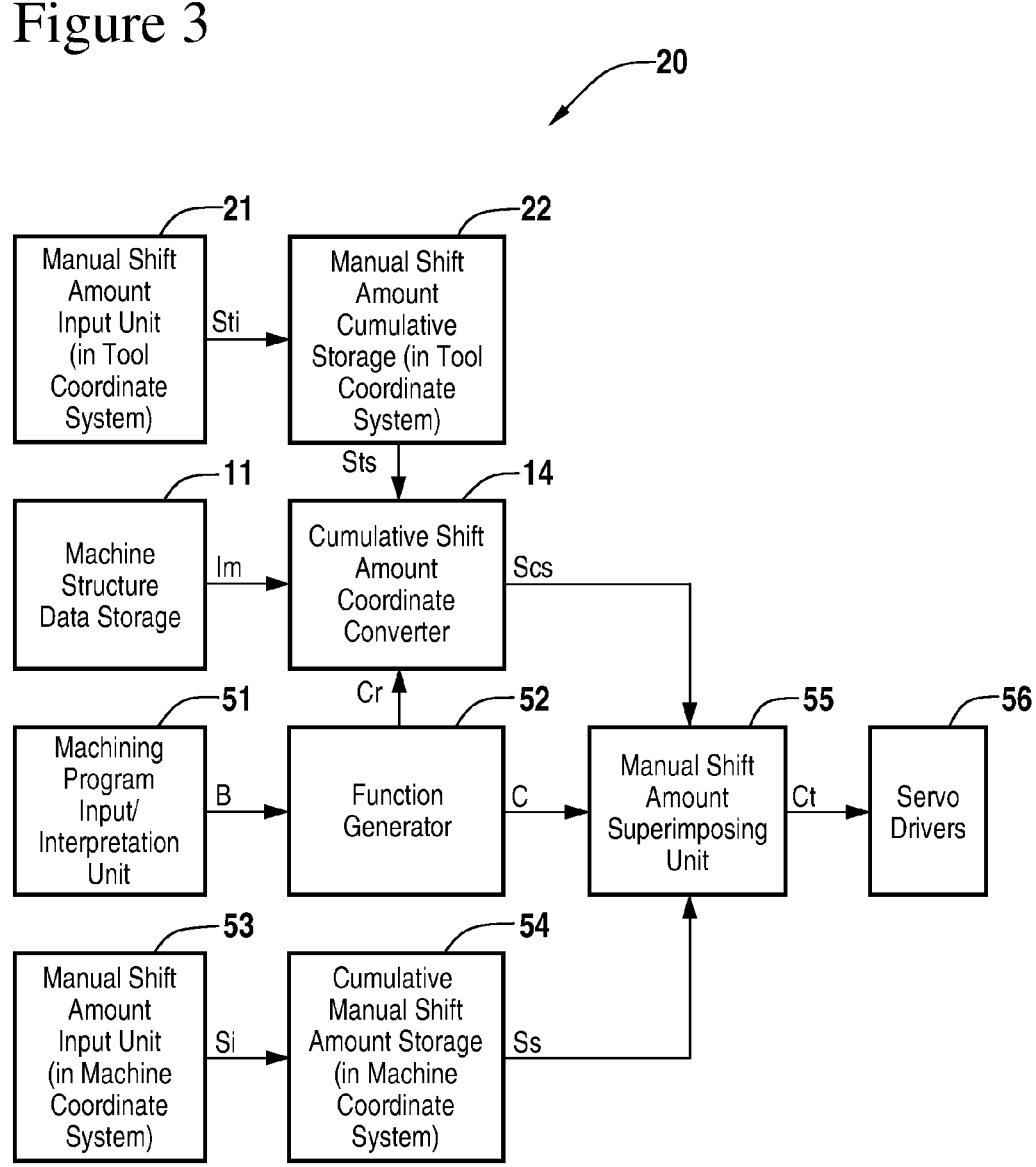
FIG. 3 is a schematic block diagram of a numerical control apparatus showing Embodiment 2 of the present invention.
Figure 4:
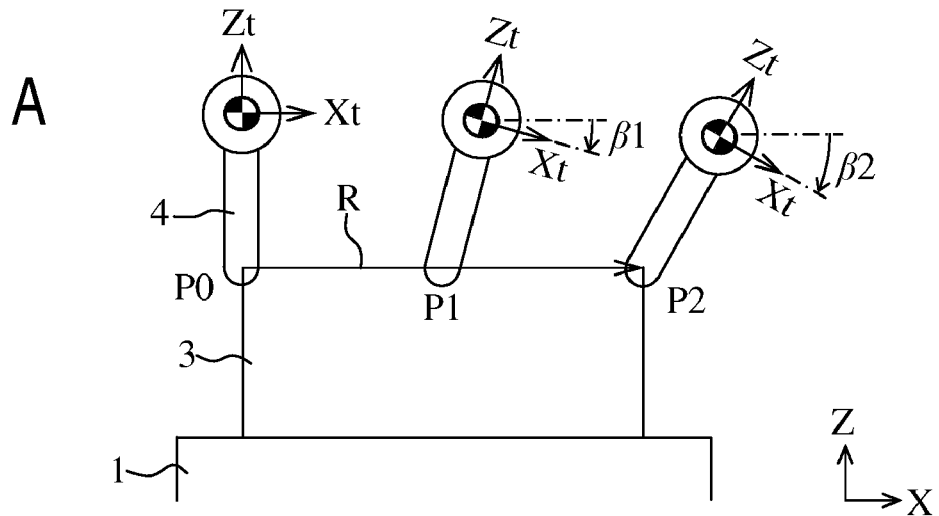
FIGS. 4A and 4B are schematic diagrams showing manual shift operations of the numerical control apparatus shown in FIG. 3.
Figure 4:
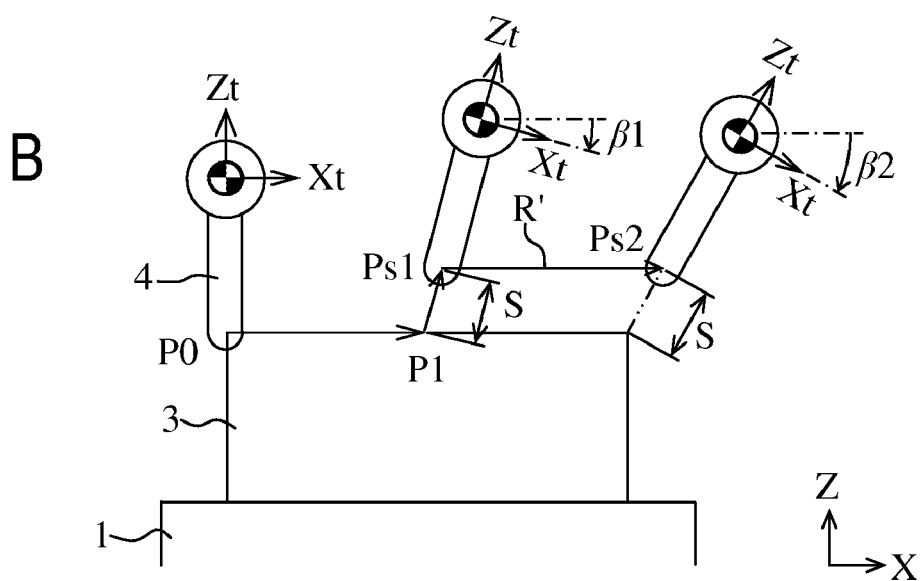
Figure 5:
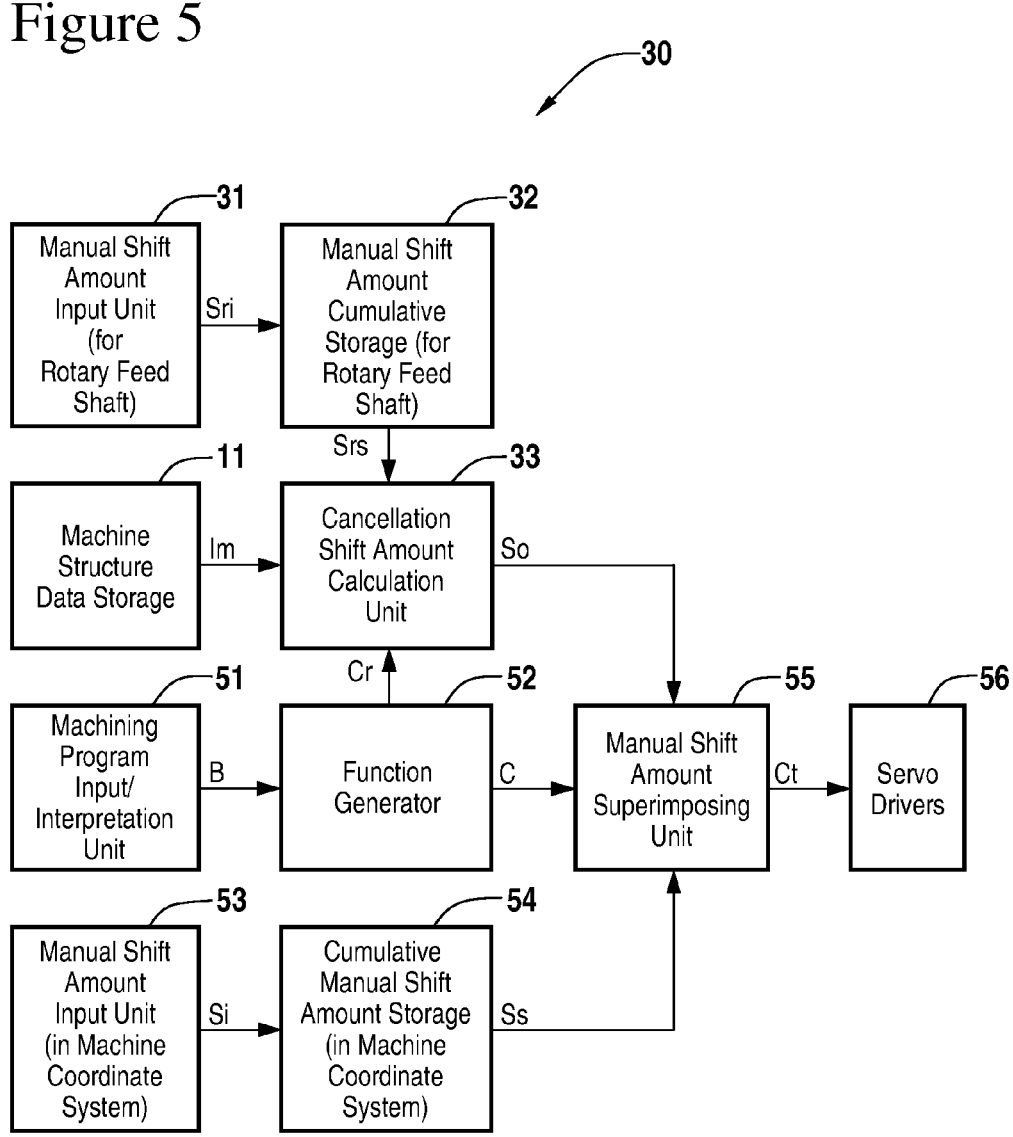
FIG. 5 is a schematic block diagram of a numerical control apparatus showing Embodiment 3 of the present invention.

Preferred embodiments of the present invention will be described hereinafter with reference to the attached drawings. FIG. 1 is a block diagram of a numerical control apparatus 10 of Embodiment 1 for receiving inputs of an amount of manual shift of or involving linear feed shafts as data in terms of or on the basis of a work coordinate system, whereas FIGS. 2A and 2B show exemplary operation of the apparatus 10 of FIG. 1. FIG. 3 is a block diagram of a numerical control apparatus 20 of Embodiment 2 for receiving inputs of an amount of manual shift involving linear feed shafts as data in terms of or on the basis of a tool coordinate system, whereas FIGS. 4A and 4B show exemplary operation of the apparatus 20 of FIG. 3. FIG. 5 is a block diagram of a numerical control apparatus 30 of Embodiment 3 suitable for manual shift operation of a rotary feed shaft, whereas FIGS. 6A-6C and 7A-7C show exemplary operation of the apparatus 30 of FIG. 5.

Embodiment 1

Figure 10:
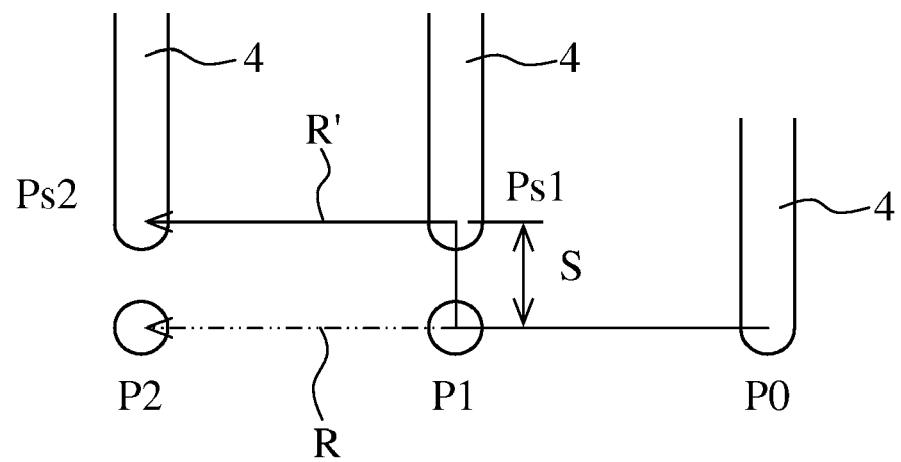
FIG. 10 is a schematic diagram showing manual shift operation of the numerical control apparatus shown in FIG. 9.

As shown in FIG. 1, the numerical control apparatus 10 of Embodiment 1 includes functional components 51-56 identical with those of the conventional numerical control apparatus 50 (see FIG. 10). In addition, the numerical control apparatus 10 includes a machine structure data storage 11, a manual shift amount input unit 12 for receiving an amount of or involving manual shift in terms of a work coordinate system, a manual shift amount cumulative storage 13 for cumulatively storing an amount of manual shift in terms of a work coordinate system, and a cumulative shift amount coordinate converter 14 for converting the coordinates of a cumulative amount of shift. The machine structure data storage 11 stores information about the structures of the feed shafts disposed in different locations of the machine tool as machine structure data, Im, required to convert an amount of manual shift from a work coordinate system to a machine coordinate system. As used in the illustrated examples, "a work coordinate system" refers to a coordinate system (the coordinate system "Xw-Yw" shown in FIG. 2) defined on work 3, which is revolved or rotated by the rotary feed shaft 2 of the table 1 of the machine tool for use with the numerical control apparatus 10. It should be noted, however, the present invention is not limited to the illustrated shaft, shaft C, but is applicable to rotary feed shafts with other shaft structures. The present application is applicable to multi-axial rotary feed shafts. As such, the work coordinate system is not limited to the illustrated examples, but is defined according to the structure of the rotary shaft specified in the machine structure data Im. It should be noted that the machine coordinate system refers to a coordinate system defined on a machine tool for use with the numerical control apparatus according to the invention.

The manual shift amount input unit 12 receives the amount of manual shift relative to the linear feed shafts specified in a work coordinate system by the operator and generates data representing the amount of manual shift in terms of the work coordinate system (or data Swi). The manual shift amount cumulative storage 13 accumulates the data Swi (representing the amount of manual shift in the work coordinate system) received from the input unit 12, stores the accumulated value in terms of the work coordinate system, and sends the coordinate converter 14 the accumulated value as a cumulative amount of shift Sws.

The coordinate converter 14 in turn receives the cumulative amount of shift in the work coordinate system (amount Sws) from the manual shift amount cumulative storage 13. The coordinate converter 14 also receives rotary feed shaft angular data Cr of interpolation point data C from the function generator 52 as well as the machine structure data Im from the machine structure data storage 11. The coordinate converter 14 subsequently converts the cumulative amount of shift in the work coordinate system (amount Sws) based on the received data from the work coordinate system to the machine coordinate system to generate and send the converted data or converted cumulative amount of shift in terms of the machine coordinate system (amount Scs) to the manual shift amount superimposing unit 55.

The manual shift amount superimposing unit 55 receives from the function generator 52 interpolation point data C representing the controlled variable defined in the program commands and also receives a cumulative amount of shift in the machine coordinate system (amount Ss) from the cumulative storage 54. The manual shift amount superimposing unit 55 additionally receives the converted amount of cumulative shift in the machine coordinate system (amount Scs) from the coordinate converter 14. The superimposing unit 55 then superimposes these received inputs to calculate shift-amount superimposition interpolation point data Ct and sends the result of this calculation to the servo drivers 56. The interpolation point data Ct provides shaft movement commands to the servomotors that drive the feed shafts of the machine tool.

The numerical control apparatus 10 operates as shown in FIGS. 2A and 2B. If no manual shift operation is carried out, the tip of the tool 4 moves from P0 to P1 to P2 (P0→P1→P2) according to the controlled variable commanded in the machining program. As shown in 2A, if an amount of shift S is entered by a manual shift operation when the tip of the tool 4 reaches P1, the tip of the tool is shifted by the amount of shift S in the work coordinate system (Xw-Yw). From this point on, the tip of the tool traces the tool path R', which is offset by the amount of shift S from the original path R, subsequently reaching Ps2.

In the foregoing operation, as shown in FIG. 2B, as the table 1 rotates or revolves, the position of the tip of the tool in terms of the machine coordinate system (X-Y) rotates with the work coordinate system about the axis of the rotary feed shaft 2. Accordingly, the value corresponding to the amount of shift that is to be added to the controlled variable commanded by the machining program changes as the table 1 revolves. In the numerical control apparatus 10 of Embodiment 1, the coordinate converter 14 has converted the cumulative amount of shift in the work coordinate system (amount Sws) to the cumulative amount of shift in the machine coordinate system (amount Scs) and the converted cumulative amount of shift Scs is superimposed on the interpolation point data C specified in the program commands, thereby accurately controlling the movement of the main spindle head along the X and Y axes as well as the movement of the rotary feed shaft 2 of the table 1 in the illustrated example. As such, the numerical control apparatus 10 implements manual shift operation in terms of a work coordinate system easily and readily understood by an operator.

Embodiment 2

As shown in FIG. 3, the numerical control apparatus 20 of Embodiment 2 includes a manual shift amount input unit 21 for receiving an amount of manual shift in terms of a tool coordinate system and a manual shift amount cumulative storage 22 for cumulatively storing an amount of manual shift in terms of a tool coordinate system and is configured to perform manual shift operation involving linear feed shafts in terms of a tool coordinate system defined on the tool 4. As used in this embodiment, "a tool coordinate system" refers to a coordinate system (the coordinate system "Xt-Zt" shown in FIG. 4) defined on tool 4, which is revolved or rotated by the rotary feed shaft of the main spindle head. It should be noted that any suitable structure may be used for the rotary feed shaft with no particular limitation. Except for the foregoing components, the structure of the numerical control apparatus 20 is identical with Embodiment 1, such that similar or identical components are denoted by identical reference numerals throughout the views.

The machine structure data storage 11 stores information about the structures of the feed shafts disposed in different locations of the machine tool as machine structure data, Im, required to convert an amount of manual shift from a tool coordinate system to a machine coordinate system. The manual shift amount input unit 21 receives the amount of manual shift relative to the linear feed shafts specified in a tool coordinate system by the operator and generates data representing the amount of manual shift in terms of the tool coordinate system (or data Sti). The manual shift amount cumulative storage 22 accumulates the data Sti (representing the amount of manual shift in the tool coordinate system) received from the input unit 21, stores the accumulated value in terms of the tool coordinate system, and sends the coordinate converter 14 the accumulated value as a cumulative amount of shift Sts.

The cumulative shift amount coordinate converter 14 carries out processing similar to that described with respect to Embodiment 1. In particular the coordinate converter 14 receives the cumulative amount of shift in the tool coordinate system (amount Sts) from the manual shift amount cumulative storage 22. The coordinate converter 14 also receives rotary feed shaft angular data Cr of interpolation point data C from the function generator 52 as well as the machine structure data Im from the machine structure data storage 11. The coordinate converter 14 then converts the cumulative amount of shift in the tool coordinate system (amount Sts) based on the aforementioned received data from the tool coordinate system to the machine coordinate system to generate and send the converted data or cumulative converted amount of shift in terms of the tool coordinate system (amount Scs) to the manual shift amount superimposing unit 55. The superimposing unit 55 then superimposes interpolation point data C received from the function generator 52, a cumulative amount of shift in the machine coordinate system (amount Ss) received from the cumulative storage 54, and the converted amount of cumulative shift in terms of the tool coordinate system (amount Scs) received from the cumulative shift amount coordinate converter 14 so as to calculate shift-amount superimposition interpolation point data Ct and sends the result of this calculation to the servo drivers 56. The interpolation point data Ct provides shaft movement commands to the servomotors that drive the feed shafts of the machine tool.

The numerical control apparatus 20 operates as shown in FIGS. 4A and 4B. As shown in FIG. 4A, if no manual shift operation is carried out, the tip of the tool 4 moves from P0 to P1 to P2 (P0→P1→P2) according to the controlled variable in program commands. As shown in 4B, if an amount of shift S is entered by a manual shift operation when the tip of the tool reaches P1, the tip of the tool is axially shifted by the amount of shift S in the tool coordinate system (Xt-Zt). From this point on, the tip of the tool traces the tool path R', which is offset or shifted from the original path R by the amount of shift S, subsequently reaching Ps2.

In the foregoing operation, as the tool 4 rotates or revolves (from β1 to β2), the position of the tip of the tool in terms of the machine coordinate system (X-Z) rotates with the tool coordinate system about the axis of the rotary feed shaft of the main spindle head (or the tool rotary shaft). Accordingly, the value corresponding to the amount of shift that is to be added to the controlled variable according to the program command changes as the tool 4 revolves. In the numerical control apparatus 20 of Embodiment 2, the coordinate converter 14 has converted the cumulative amount of shift in the tool coordinate system (amount Sts) to the amount of cumulative shift in the machine coordinate system (amount Scs) and the converted cumulative amount of shift Scs is superimposed on the interpolation point data C specified in the program commands, thereby accurately controlling the movement of the main spindle head along the X and Z axes as well as the movement of the tool revolution shaft of the tool in the illustrated example. As such, the numerical control apparatus 20 implements manual shift operation in terms of a work coordinate system easily and readily understood by a machine operator.

Embodiment 3

As shown in FIG. 5, the numerical control apparatus 30 of Embodiment 3 includes a manual shift amount input unit 31 for receiving an amount of manual shift of or involving a rotary feed shaft, a manual shift amount cumulative storage 32 for cumulatively storing an amount of manual shift involving a rotary feed shaft, and a cancellation shift amount calculation unit 33. The numerical control apparatus 30 is also configured to perform manual shift operation involving the rotary shift shaft without changing the relative positions between the work 3 and the successive locations of the tool tip P0, P1, and P2. The structure of the numerical control apparatus 20 is identical with Embodiment 1, such that those similar or identical components are denoted by identical reference numerals throughout the views.

The machine structure data storage 11 stores information about the structures of the feed shafts disposed in different locations of the machine tool as machine structure data Im. The manual shift amount input unit 31 receives an amount of manual shift involving the rotary feed shaft and generates data representing the amount of manual shift involving the rotary feed shaft (or data Sri). The manual shift amount cumulative storage 32 accumulates the data Sri (representing the amount of manual shift of the rotary feed shaft) received from the input unit 31, stores the accumulated value, and sends the cancellation shift amount calculation unit 33 the accumulated value as a cumulative amount of shift Srs.

The cancellation shift amount calculation unit 33 in turn receives the cumulative amount of shift of or involving the rotary feed shaft (amount Srs) from the manual shift amount cumulative storage 32. The calculation unit 33 also receives interpolation point data C from the function generator 52 as well as the machine structure data Im from the machine structure data storage 11. Based on the received data, the cancellation shift amount calculation unit 33 generates a cancellation shift amount So for canceling the displacement of the tip of the tool caused by the manual shift operation of the rotary feed shaft.

The manual shift amount superimposing unit 55 then receives the interpolation point data C from the function generator 52, a cumulative amount of shift in the machine coordinate system (amount Ss) from the cumulative storage 54, and the cancellation shift amount So from the cancellation shift amount calculation unit 33. Additionally, the superimposing unit 55 superimposes the foregoing received data so as to calculate shift-amount superimposition interpolation point data Ct and sends the result of this calculation to the servo drivers 56. The interpolation point data Ct provides shaft movement commands to the servomotors that drive the feed shafts of the machine tool.

Figure 6:
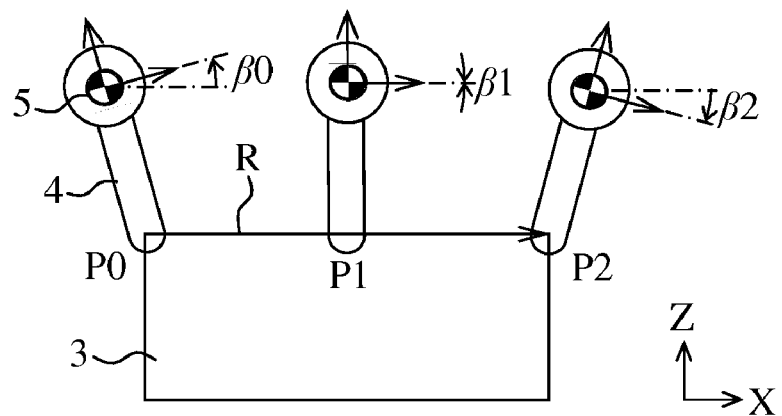
FIGS. 6A-6C are schematic diagrams showing manual shift operations of the numerical control apparatus of shown in FIG. 5.
Figure 6:
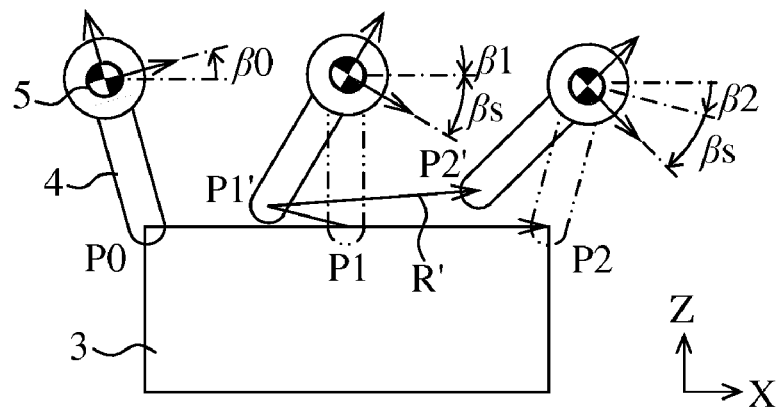
Figure 6:
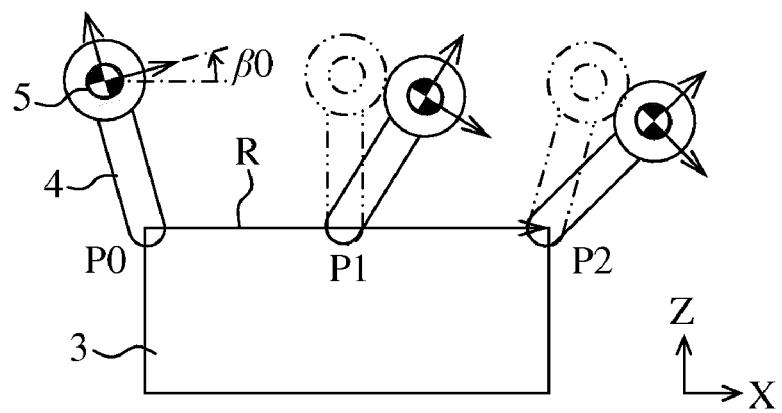

The foregoing numerical control apparatus 30 operates as shown in FIGS. 6A-6C and 7A-7C. FIGS. 6A-6C illustrate a machine tool including a tool 4 with a rotary feed shaft 5. FIG. 6A shows a tool path R that results if no manual shift operation is performed, whereas FIG. 6B shows a tool path R' that results if manual shift operation is performed by the conventional numerical control apparatus 50. FIG. 6C shows an identical tool path R to that in FIG. 6A, which results if manual shift operation is performed by the numerical control apparatus 30 according to Embodiment 3.

As shown in FIG. 6A, if no manual shift operation is performed, the attitude of the tool 4 relative to the work 3, i.e., the rotational angle of the rotary feed shaft 5 changes from β0 to β1 to β2 (β0→β1→β2) as specified by the shaft movement commands in the machining program while the tip of the tool moves from P0 to P1 to P2 (P0→P1→P2).

As shown in 6B, if an amount of shift βs of or involving the rotary feed shaft 5 is entered by a manual shift operation when the tip of the tool 4 reaches P1, the conventional numerical control apparatus 50 will simply superimpose the amount of shift βs on the command angle of the rotary feed shaft 5, thereby shifting the position of the tool tip from the original position P1 to P1'. From this point on, the tip of the tool no longer traces the original path R but traces the tool path R', which is offset from the part of the work 3 intended to be machined, and subsequently reaches P2'.

Conversely, the numerical control apparatus 30 of Embodiment 3 controls the operation of the tool feed shafts based on the cancellation shift amount So calculated by the cancellation shift amount calculation unit 33 such that as shown in FIG. 6C, the attitude of the tool 4 may be changed without changing the positions of the tool tip (P0, P1, P2) with respect to the work 3. This provides for manual shift operation of the rotary feed shaft 5 with the tip of the tool 4 kept in contact with the part of the work 3 to be machined.

Figure 7:
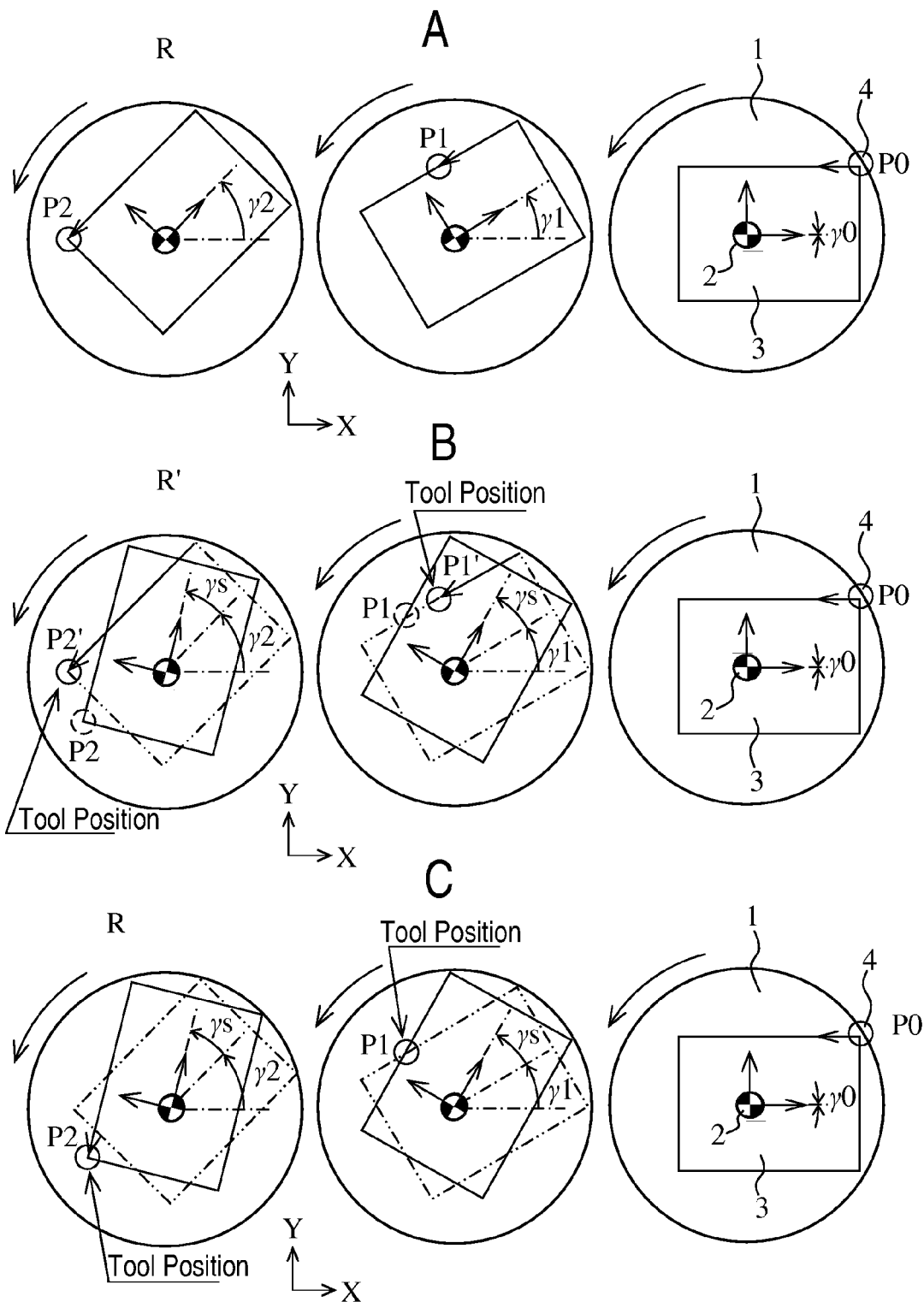
FIG. 7A-7C are schematic diagrams showing different manual shift operations of the numerical control apparatus of shown in FIG. 5.
Figure 8:
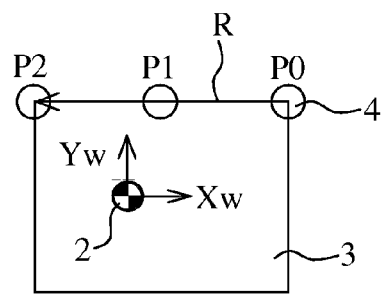
FIGS. 8A and 8B are schematic diagrams of a conventional tool machine showing tool paths in a different coordinate system.
Figure 8:
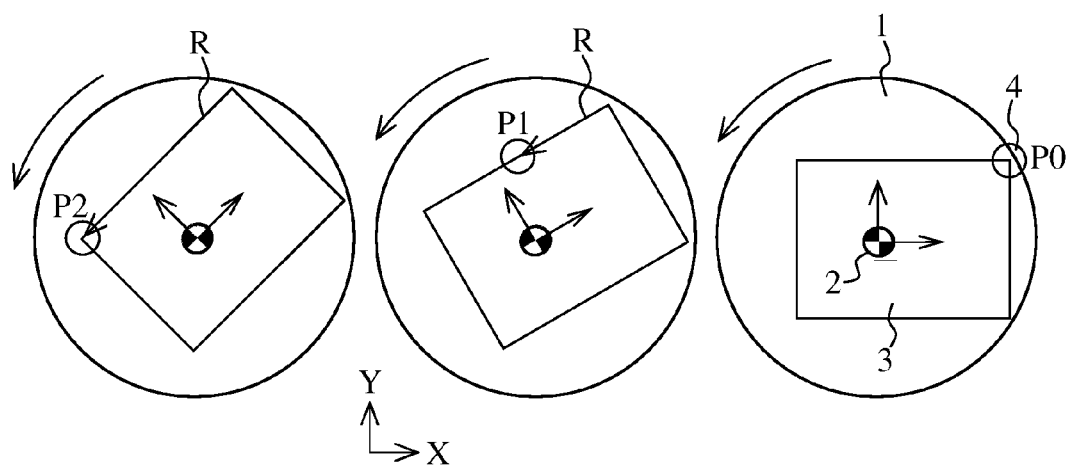
Figure 9:
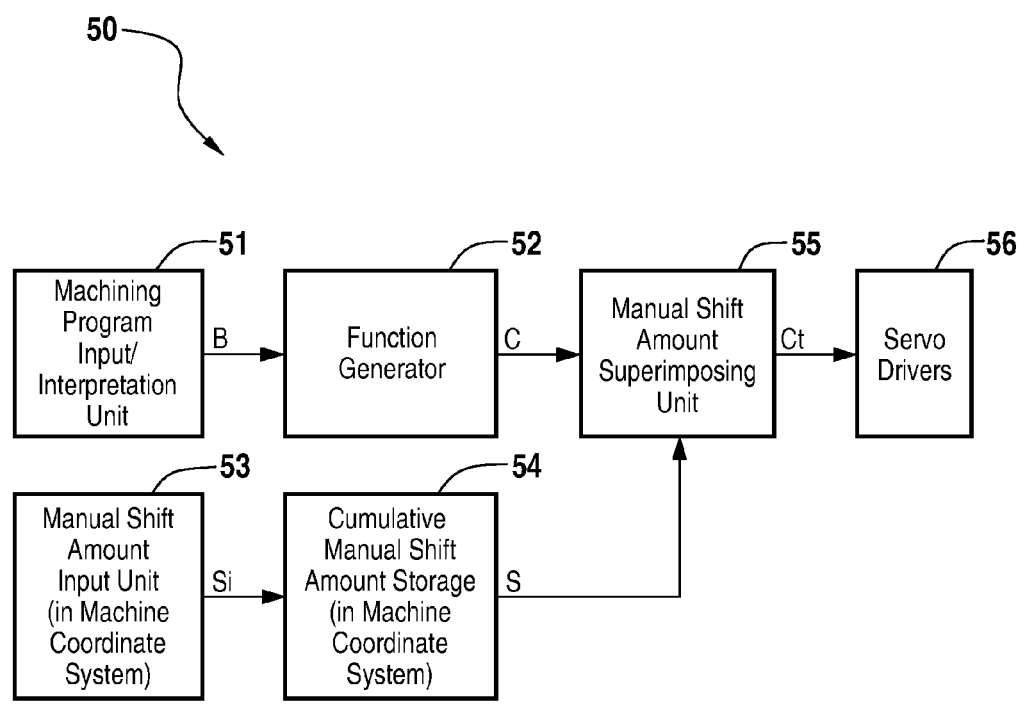
FIG. 9 is a block diagram of a conventional numerical control apparatus.

FIGS. 7A-7C illustrate a machine tool including a rotary feed shaft 2 on the table 1. FIG. 7A shows a tool path R that results if no manual shift operation is performed, whereas FIG. 7B shows a tool path R' that results if manual shift operation is performed by the conventional numerical control apparatus 50. FIG. 7C shows an identical tool path R to that in FIG. 7A, which results if manual shift operation is performed by the numerical control apparatus 30 according to Embodiment 3.

As shown in FIG. 7A, if no manual shift operation is performed, the rotary angle of the table 1 and the work 3 changes from $\gamma 0$ to $\gamma 1$ to $\gamma 2$ ($\gamma 0 \rightarrow \gamma 1 \rightarrow \gamma 2$) as specified by the shaft movement commands in the machining program while the tip of the tool moves on the work 3 from P0 to P1 to P2 (P0$\rightarrow$P1$\rightarrow$P2).

As shown in 7B, if an amount of shift $\gamma s$ of or involving the rotary feed shaft 2 is entered by a manual shift operation when the tip of the tool 4 reaches P1, the conventional numerical control apparatus 50 will simply superimpose the amount of shift $\gamma s$ on the command angle of the rotary feed shaft 2. In the mean time, the movement of the tool feed shafts remains the same as in the case where the amount of shift $\gamma s$ is not entered. Accordingly, the tip of the tool goes only as far as P1' without advancing to P1, and from this point on, the tip of the tool traces the tool path R' while lagging behind in the path and subsequently reaching P2'.

Conversely, the numerical control apparatus 30 of Embodiment 3 controls the operation of the tool feed shafts based on the cancellation shift amount So calculated by the cancellation shift amount calculation unit 33 such that as shown in FIG. 7C, the rotary angle of the table 1 may be changed without changing the positions of the tool tip (P0, P1, P2) with respect to the work 3. This provides for manual shift operation of the rotary feed shaft 2 with the tip of the tool 4 kept in contact with the part of the work 3 to be machined.

It should be noted that the present invention is not limited to the foregoing embodiments. For example, the functional components of the numerical control apparatuses according to Embodiments 1-3 (the functional components shown in FIGS. 1, 3, and 5) may be used in conjunction or integrated with one another to provide a numerical control apparatus capable of comprehensively performing manual shift operation of or involving its linear and rotary feed shafts.

Furthermore, one of ordinary skill in the art will additionally appreciate that the above embodiments are only an illustration and not restrictive in any sense and that there are different ways to alter the parameters of the embodiments disclosed, such as the size, shape, or type of elements or materials, in a manner still in keeping with the spirit and scope of the present invention as set forth below.

What is claimed is:

1. A numerical control apparatus for a machine tool capable of controlling at least one linear feed shaft of the machine tool for linearly feeding a tool and at least one rotary feed shaft of the machine tool for revolving work as specified based on interpolation point data in terms of a machine coordinate system defined on the machine tool according to commands of a machining program so as to cause relative movement between the work and the tool, the apparatus comprising:

a machine structure data storage for storing information about the structures of the at least one linear feed shaft and the at least one rotary feed shaft as machine structure data;

a manual shift amount input unit for receiving an amount of manual shift involving the at least one linear feed shaft entered by an operator in terms of a work coordinate system defined on the work revolved by the at least one rotary feed shaft so as to allow the operator to manually shift the tool during control of the at least one linear feed shaft and the at least one rotary feed shaft according to a command in the machining program;

a manual shift amount cumulative storage for cumulatively storing the received amount of manual shift;

a cumulative shift amount coordinate converter for converting the cumulatively stored amount of shift from the work coordinate system to a machine coordinate system defined on the machine tool based on rotary feed shaft angular data of the interpolation point data and the machine structure data; and a manual shift amount superimposing unit for superimposing the cumulative amount of shift converted to the machine coordinate system on interpolation point data in terms of the machine coordinate system according to a command in the machining program.

2. A numerical control apparatus in accordance with claim 1, wherein the cumulative shift amount coordinate converter uses the machine structure data to perform the conversion.

\* \* \* \* \*